United States Patent [19]

Jasperson

[11] 4,312,908

[45] Jan. 26, 1982

[54] COMPOSITE STRUCTURES, NEW ADHESIVE, AND CEMENT COMPOSITION

[76] Inventor: F. Bon Jasperson, 4121 NE. 26 Ave., Ft. Lauderdale, Fla. 33308

[21] Appl. No.: 81,862

[22] Filed: Oct. 4, 1979

Related U.S. Application Data

[60] Continuation-in-part of Ser. No. 961,201, Nov. 16, 1978, Pat. No. 4,256,804, which is a division of Ser. No. 854,204, Nov. 23, 1977, Pat. No. 4,146,672, which is a continuation of Ser. No. 747,801, Dec. 6, 1976, abandoned.

[51] Int. Cl.$^3$ .......................... B32B 3/26; B32B 7/02; B32B 31/06
[52] U.S. Cl. ...................................... 428/214; 52/517; 156/349; 428/215; 428/423.1; 428/500; 428/511; 428/317.7
[58] Field of Search ............... 428/332, 337, 339, 402, 428/407, 500, 480, 522, 213, 323, 327, 447, 315, 310, 314, 423.1; 52/517; 156/349

[56] References Cited

U.S. PATENT DOCUMENTS

| | | |
|---|---|---|
| 3,607,615 | 9/1971 | Hatakeyama et al. .............. 428/522 |
| 3,849,357 | 11/1974 | Wolf ..................................... 428/447 |
| 3,933,875 | 1/1976 | Brose et al. ......................... 428/480 |
| 4,146,672 | 3/1979 | Jasperson ............................ 428/332 |

FOREIGN PATENT DOCUMENTS

| | | |
|---|---|---|
| 2512191 | 10/1976 | Fed. Rep. of Germany ...... 428/315 |
| 1374584 | 11/1974 | United Kingdom ................ 428/315 |

*Primary Examiner*—Thomas J. Herbert, Jr.
*Attorney, Agent, or Firm*—Murray and Whisenhunt

[57] ABSTRACT

An insulating structural panel comprising a layer of rigid insulation of at least one inch thickness sandwiched between two adhered facings of at least 1/16 inch thickness wherein at least one of said facings is adhered to the insulation by an adhesive which is a dried residue of a latex polymer rich coating of not less than 2-4 mils thick and containing at least 80% by weight of a film-forming polymer selected from the group consisting of acrylic polymers and vinyl polymers having a Mar Elasticity Value of at least 1 and a wet and dry adhesion to maintain adhesion to said facing under normal atmospheric conditions.

7 Claims, No Drawings

COMPOSITE STRUCTURES, NEW ADHESIVE, AND CEMENT COMPOSITION

CROSS REFERENCE TO RELATED APPLICATIONS

This application is a continuation-in-part of my copending application Ser. No. 961,201, filed Nov. 16, 1978, now U.S. Pat. No. 4,256,804 as a divisional application of my earlier application Ser. No. 854,204, now U.S. Pat. No. 4,146,672, filed Nov. 23, 1977, as a continuation of my earlier application Ser. No. 747,801, filed Dec. 6, 1976, and now abandoned.

SUMMARY OF THE INVENTION

In one embodiment, the present invention is directed to a composite structure which is suitable for use as a roof or a wall of a building and which shows resistance to penetration by fires started on the interior side of the building, while at the same time, exhibiting excellent water resistance. The composite structure includes an interior substrate, which can be a layer of structural plywood sheathing, a layer of concrete, a plastic panel or any other suitable substrate. A layer of rigid insulation, having an insulating ability at least equal to one inch of rigid unrethane foam, is adhered to the interior substrate. On the outside of the rigid insulation layer, a layer of cementitious material adhered to the insulation, and overlying the cementitious material is an exterior layer of a film-forming acrylic or vinyl polymer exhibiting a Mar Elasticity Value of at least 1, and having a thickness of at least 2-4 mils.

In another embodiment, the present invention includes a pumpable, flowable, lightweight cementitious composition, said composition comprising a mixture of portland cement, a lightweight aggregate, water, and methyl cellulose. The methyl cellulose maintains the solid ingredients in suspension, retards evaporation of water from the composition and therefore retards the cure rate of the composition, and acts as a thickening agent for the composition, as well as the lubricant during any pumping operation.

In yet another embodiment, the present invention includes a new use for a polymer rich latex coating composition of the nature described in U.S. Pat. No. 4,146,672. The new use is as an adhesive, and especially as an adhesive to bind a layer of insulation to another surface.

In another embodiment, the present invention provides an insulating structural panel which includes a first building panel at least one sixteenth inch thick, the second building panel at least one sixteenth inch thick, a layer of rigid insulation sandwiched between the first panel and the second panel, the panels adhered to the insulation, with at least one of the panels adhered to the insulation using as an adhesive the water-proof coating composition of my U.S. Pat. No. 4,146,672. The rigid insulation layer has an insulating ability of at least one inch of rigid urethane foam.

Finally, in yet another embodiment, the present invention includes an insulating structural panel suitable for use as an exterior wall or roof of a building. The panel includes an interior panel which is at least one sixteenth inch thick, an exterior panel at least one sixteenth inch thick, a layer of rigid insulation sandwiched between the interior and exterior panels and adhered thereto, and a water-proof coating over the exterior surface of the exterior panel, the water-proof coating being the dry residue of the coating composition of my U.S. Pat. No. 4,146,672.

DETAILED DESCRIPTION OF THE INVENTION

The first embodiment of the present invention relates to a composite structure which is suitable for use as an exterior roof or wall of a building. The composite structure can include an existing roof or wall, as in the case of repair, or a new roof or wall, such as in the instance of new construction. The composite structure includes an interior substrate, a layer of adhesive, a layer of rigid insulation, a layer of cementitious material and a layer of water-proofing polymeric coating.

The substrate can be any substrate conventionally found in the building construction industry, including plywood or other wood products, plastic, concrete or other cementitious products, or steel. Preferably, the substrate exhibits an absorbent surface, such as, for instance, cement or plywood. The major advantage of the composite structure of the invention resides in use with plywood or other wood products, as the composite structure exhibits a significant effect with respect to reducing the burning characteristics of the resulting building.

A rigid insulation layer is adhered to the substrate, and the insulation layer is preferably a rigid plastic foam, such as polystrene, polyurethane or vinyl foam. However, wood fiber board insulation or other rigid insulating products can be used in lieu of the rigid plastic foam. In any event, the layer of insulation should exhibit an insulating ability at least equal to that provided by one inch of rigid urethane foam.

The adhesive used to adhere the insulation to the substrate can be any of various adhesives. If the substrate is steel, concrete may be used as an adhesive, or an epoxy may be used if the epoxy does not attack the foam itself. For the use of rigid plastic foams on plywood or other absorbent surface substrates, it is preferred to use as an adhesive a polymer rich latex composition described hereinafter as another embodiment of the present invention.

The amount of adhesive which is used need only be that to adequately adhere the insulation to the substrate. Greater amounts of adhesive may be used, but is unnecessary and generally will not be utilized.

If a large surface is involved, the rigid insulation will generally be obtained in the form of blocks or sheets of the insulation, which can be individually adhered in place over the substrate.

A cementitious layer is placed over the insulation layer, and serves several functions. The primary advantage of the cementitious layer is to reduce the flammability characteristics of the resulting building, especially in the instance wherein the substrate is of wood or wood composition. The weight of the cementitious layer also serves to more firmly hold the insulation layer against high wind loads. The cementitious material helps distribute the weight of persons or equipment on the insulation, and thus serves to prevent damage to the insulation.

The cementitious layer must be at least 1/16 inch thick in order to function effectively, and it is greatly preferred that the cementitious layer be more than ¼ inch thick, and preferably about ½ inch thick. There is no upper limit on the thickness of the cementitious layer, but because of weight constraints when the composite structure is utilized as a roof component, the cementitious layer will rarely be more than 6 inches thick.

The layer of rigid insulation also has no upper limit with respect to the thickness thereof, but for economic reasons, the insulation will rarely be more than 12 inches thick, and generally will be less than 8 inches thick. The layer of rigid insulation will generally be at least 1 inch thick, and, as indicated hereinabove, will be of such a thickness as to have an insulating ability at least equal to that of 1 inch of rigid urethane foam.

The final component of the composite structure is an exterior layer which is the dried residue of a polymer-rich latex coating composition, which layer is about at least 2–4 mils thick. There is no upper limit as to the thickness of the exterior layer, but there is no functional reason to have a layer thicker than 50 mils, and for economic reasons, the layer will generally be less than 20 mils in thickness. Preferably, the layer is 5–10 mils in thickness. Any of the polymer-rich latex coating compositions described and claimed in my aforesaid U.S. Pat. No. 4,146,672, the disclosure of which is hereby incorporated by reference, may be used to form the exterior layer.

In addition to the components indicated above, the composite structure can also include other conventional components. For example, a sealant may be applied over the cementitious material, prior to application of the exterior layer thereto, in instances where the cementitious material is unusually porous, and would thus require larger amounts of the polymer-rich latex coating composition.

If the composite structure is formed during the repair of an existing wall, then it may be advantageous to utilize asbestos fibers or other fibrous materials in the cement, in order to render the cementitious product more resistant to slump before cure.

While the composite structure may be utilized in various applications, it is especially useful as a component of the roof of a building.

Preferably, the exterior layer of polymer-rich coating has a Mar Elasticity Value of at least 2, and more preferably of at least 4. The polymer is preferably an acrylic polymer, especially those polymers and copolymers containing units of acrylic acid, methacrylic acid, their esters or acrylonitrile. Another preferred group of polymers is vinyl polymers, especially those vinyl polymers from the group consisting of vinyl acetate polymers, vinyl chloride polymers and vinylidine chloride polymers.

CEMENTITIOUS COMPOSITION

The cementitious composition of the present invention is designed specifically to be able to be pumped to a roof, even to a height as high as several stories, up to twenty or so stories in height, and then flow out upon application, to thereby minimize the amount of leveling required. As will be readily appreciated, with a flowable composition, the primary application of the cementitious composition is on flat roofs, as if the roof has a substantial pitch, a different cementitious composition, having little or no flowability, must be utilized.

Because the composition is designed to be applied to a roof, wherein additional weight is to be avoided, it is greatly preferred that the aggregate utilized in the cementitious composition be a lightweight aggregate, such as vermiculite, perlite, burnt and bloated brick or other lightweight aggregates known to the art. However, up to 50% by volume of the aggregate may be replaced with conventional aggregates having higher densities, such as, for instance, sand or the like. If sand is utilized, it is preferably a silica sand having a size of 20 to 100 mesh, although larger and smaller sizes may also be utilized. It may be desirable to utilize such sand as a partial replacement of the lightweight aggregate to obtain a coarser surface of the dried cementitious composition, which exhibits better adhesion to subsequently applied coatings by providing more sites for mechanical keying.

The key to the cementitious composition of the present invention is the use of a methyl cellulose thickener. The preferred methyl cellulose thickener is a hydroxypropyl methyl cellulose, such as, for instance, Methocel J75 MS, a product sold by Dow Chemical, exhibiting a viscosity of 75,000 cps in the form of a 2% solution at room temperature. Other methyl cellulose thickening agents known to the art may be used in place of this preferred thickening agent. The methyl cellulose thickening agent is utilized in an amount of from $\frac{1}{8}$ to $\frac{1}{2}$ pound per cubic foot of cement, and preferably the amount of methyl cellulose thickening agent is about $\frac{1}{4}$ pound per cubic foot of cement. If less methyl cellulose is used, the resulting composition will exhibit a tendency for the aggregate to separate. On the other hand, if higher amounts of methyl cellulose are used, then the resulting composition will have a viscosity which is too high to exhibit the pumpable, flowable characteristics which are desired.

The use of too little water in the cementitious composition results in a composition which cannot be pumped or can only be pumped with difficulty, and which will not exhibit the flowability characteristics which are desired. On the other hand, the use of too much water in the system results in a composition which is of poor or only marginal physical properties with respect to such physical characteristics as compressive strength, tensile strength, etc.

Compositions containing higher amounts of water will produce much lower apparent bulk densities of the dried product, as the dried product will be more much more porous and have a greater amount of air entrapped in the interior of thicker sections. This is illustrated by the following data, wherein test compositions were made using one 45 pound bag of mixed cement/lightweight aggregate (vermiculite) with the bag containing $\frac{1}{3}$ by volume of Portland cement type 1. The composition also contained Methocel J75 MS in a ratio of $\frac{1}{4}$ pound per cubic foot of the cement. With this particular composition, 3.35 gallons of water represented approximately the minimum amount of water which is acceptable. The wet density of the resulting formulation, after the water addition, was 70.4 pounds per cubic foot. After air drying for 24 hours, the composition exhibited a density of 61.6 pounds per cubic foot. After 48 hours of air drying, the density was 58.4 pounds per cubic foot, and after 72 hours, the density was 56.9 pounds per cubic foot. This composition exhibited pumpability and flowability which were marginal, and thus represent about the lowest level of water addition for this particular combination of ingredients.

A similar composition was prepared, except 7.75 gallons of water were used per 45 pound bag of mix, and this composition, which contained approximately the maximum amount of water for the particular composition, exhibited very marginal properties and an extremely porous nature of the dried product. The wet density of the composition was 63 pounds per cubic foot, the 24-hour air dry under atmospheric conditions resulted in a density of 51.75 pounds per cubic foot, the 48-hour air dry density was 41.85 pounds per cubic foot, and the 72-hour air dry product exhibited a density of only 34.9 pounds per cubic foot.

ADHESIVE COMPOSITION

The applicant has discovered that the composition of his U.S. Pat. No. 4,146,672 functions very effectively as the adhesive used in making the composite structures and structural panels described in this application. The advantage of using these novel adhesives is that the resulting adhesive layer illustrates the same characteristics of elasticity as exhibited by the water-proof coating of the applicant's U.S. Pat. No. 4,146,672. As a result, therefore, the resulting assemblies can withstand considerable shock, either caused by thermal expansion and/or contraction, or mechanical shocks, such as impacts, with less chance of adhesive failure than with less elastic adhesive systems.

Any of the compositions disclosed in the aforesaid U.S. Pat. No. 4,146,672 can be used as the adhesive of the present invention, and the disclosure of U.S. Pat. No. 4,146,672 is hereby incorporated by reference for the teachings of such compositions therein. The compositions can be varied as desired by the use of conventional additives, and by selection of respective ingredients. For instance, for cold weather applications, it may be desirable to utilize an acrylic or vinyl polymer having a lower $T_g$. If desired, a thickening agent can be utilized, as well as conventional preservatives, defoamers, fungicides, dispersing agents and the like.

STRUCTURAL PANELS

Another embodiment of the present invention relates to the provision of structural panels which are suitable for use to construct walls or roofs of buildings, or which can be used in other structural applications, such as panels for making the walls or roofs of mobile homes, or in the construction of boats, and especially houseboats, or truck bodies. Two different types of structural panels are provided, one having the water-proof coating described in U.S. Pat. No. 4,146,672 thereon, and the other using such water-proof coating composition as an adhesive to join a panel facing to an interior core of insulation material. The preferred structural panels of this embodiment, however, utilize the coating compositions of U.S. Pat. No. 4,146,672 as an adhesive to join both facings to the core of insulation, and also to provide a water-proof coating on the exterior side of the structural panel.

The structural panel of this embodiment include a facing on each side of the panel with a core of rigid insulation thereinbetween. The core of rigid insulation is preferably a rigid plastic foam, such as, for instance, polystyrene foam, polyurethane foam, or vinyl foam.

The core of rigid insulation must be at least one inch thick, in order to provide adequate properties in the resulting sandwich structure panel. The core of insulation may be much thicker, up to 6, 8 or 12 inches in thickness, but normally adequate strength and insulation ability will be obtained by using a core which is from 1 to 6 inches in thickness, and thus this range is preferred.

The structural panel may be used in interior or exterior applications, but for ease of reference in this application, one side of the structural panel will be referenced as the exterior side, and one side will be referenced as the interior side, even though the panel may be used in applications wherein neither of the structural panel sides are exposed to the elements.

The interior and exterior facings must be at least 1/16 inch thick, in order to provide adequate strength to the structural panel. Very thin facings can be used, such as, for instance, conventional door skins, but for stronger structural panels, it is preferred that the facings be at least ¼ inch in thickness. Much thicker facings can be used, but for obtaining the strongest structural panel commensurate with weight reduction, it is generally preferred that the facings be no more than 1 inch in thickness, and preferably, less than ½ inch in thickness.

In the preferred structural panels of this embodiment, the coating composition of my U.S. Pat. No. 4,146,672 will be utilized both as the adhesive to join both facings of the panel to the rigid insulation core, and will also be utilized to provide a water-proof coating on at least the exterior side of the structural panel. The water-proof coating can be provided on both sides of the structural panel, if desired.

The amount of insulation used need only be that to achieve an adequate adhesive bond between the facings and the rigid insulation core, and while greater amounts of the coating composition can be used as the adhesive, it is more costly to utilize greater amounts than the minimum amount required to provide adequate strength characteristics, and thus the use of such greater amounts is generally avoided.

The water-proof coating on the exterior side of the structural panel will be at least 2-4 mils thick and can be much thicker, even up to 50 mils or even thicker, but generally no advantage is obtained by using a water-proof coating greater than 20 mils in thickness.

While the above-described structural panels are decidedly preferred, other variations of the structural panels fall within the scope of the present embodiment of this invention. The structural panels may utilize the water-proof coating described in my U.S. Pat. No. 4,146,672 on at least the exterior side of the exterior facing, and conventional adhesive materials, such as, for instance, epoxy resins (when compatible with the material of the rigid insulation core), may be utilized as the adhesive material. Alternatively, the coating composition of my U.S. Pat. No. 4,146,672 can be used as an adhesive to join at least one of the facings to the rigid insulation core, and other types of water-proof coatings, or no such coating, can be utilized. In certain interior structural panel applications, no such water-proof coating may be required, as will be clear to those in the art.

The preferred water-proof coating and adhesive composition (the same composition is used for both uses) of the present invention, for the various embodiments described hereinabove, is based on an acrylic resin supplied by B. F. Goodrich. This acrylic resin is Hycar 2600X92, supplied in the form of a 50% emulsion. This particular resin has a $T_g$ of 10° F. The coating/adhesive composition is as follows:

| | |
|---|---|
| Hycar 2600×92 acrylic resin (50% by weight of resin in aqueous emulsion) | 138 gallons |
| Rutile titanium dioxide pigment composition (see description below) | 60.5 pounds |
| Formaldehyde (preservative) 37% aqueous solution | 1150 ml |
| Methocel J75 MS thickener | 5.5 pounds |

| -continued | | |
|---|---|---|
| (Dow Chemical) | | |
| Balab 748 defoamer (Witco Chemical) | 79 | ounces |
| Nopcocide N-96 fungicide composition (see description below) | 21 | pounds |
| Water | 4.3 | gallons |

The titanium dioxide composition utilized above is a mixture of the following ingredients:

| | | |
|---|---|---|
| Water | 25 | gallons |
| Rutile titanium dioxide | 375 | pounds |
| Dispersayd W-22 dispersion agent (Daniel Products) | 2400 | ml |
| Methocel J75 MS thickener (Dow Chemical) | 1 | pound |
| The Nopcocide N-96 fungicide composition used in the above formulation is as follows: | | |
| Water | 12.5 | gallons |
| Nopcocide N-96 fungicide (Diamond Shamrock) | 100 | pounds |
| Dispersayd W-22 dispersion agent (Daniel Products) | 1200 | ml |
| Methocel J75 MS thickener (Dow Chemical) | 1 | pound |

The structural panel of this embodiment may utilize any conventional structural panel facing. The facing could be of cement or gypsum board, as well as various types of plastics, which may be reinforced by the use of glass fibers or other conventional reinforcing agents. For instance, a polyester glass fiber reinforced sheet could be utilized. However, it is preferred that the structural panel facings be of wood, and especially of plywood.

7 ft by 2 ft panels were made using a 4 inch polystyrene foam insulation core, and a ⅛ inch door skin plywood sheet on one side, with a ½ inch thick lightweight concrete coating on the opposite side of the core. A liberal application of the adhesive system described above was applied to adhere the door skin to the polystyrene core, with the resulting assembly pressed together for 8 hours to cure. The lightweight concrete composition utilized was the preferred composition described hereinabove, which was permitted to cure for 9 days. With the lightweight concrete being applied directly to the Styrofoam and permitted to cure in contact therewith, no separate adhesive was required.

The resulting structural panel was then loaded with a load of 110 pounds per cubic foot, and held this load for 8 hours until failure.

Another panel was prepared, using 4 inches of polystyrene rigid foam insulation as the core, and adhering two door skins, each ⅛ inch thick, to opposite sides thereof. The door skins were adhered using the B. F. Goodrich acrylic resin-based adhesive system described hereinabove, with liberal application of the adhesive to the structural panel component, and pressing of the panel assembly together for 8 hours during adhesive cure. The resulting panel was loaded with a load of 110 pounds per square foot, similar to the test described above, and resisted the load application for 7½ hours until failure.

What is claimed is:

1. An insulating structural panel comprising a first facing at least 1/16 inch thick, a second facing at least 1/16 inch thick, a layer of rigid insulation at least one inch thick, sandwiched between said first facing and said second facing, said facings adhered to said insulation, at least one of said facings adhered to said insulation by an adhesive which is the dried residue of a latex polymer-rich coating composition, said residue being not less than 2-4 mils thick and containing at least 80% by weight of a film-forming polymer selected from the group consisting of acrylic polymers and vinyl polymers and having a Mar Elasticity Value of at least 1, and a wet and dry adhesion to maintain adhesion to said facing under normal atmospheric conditions.

2. Panel of claim 1, wherein both of said facings are adhered to said insulation by said adhesive.

3. Panel of claim 1, wherein said insulation is a rigid synthetic polymer foam insulation.

4. Panel of claim 3, wherein said foam insulation is selected from the group consisting of polystyrene foam, polyurethane foam and vinyl foam.

5. Panel of claim 1, wherein at least one of said facings is selected from the group consisting of cement facings, plastic facings, wood facings and gypsum board facings.

6. Panel of claim 5, wherein at least one of said facings is plywood.

7. Panel of claim 6, wherein both of said facings are of plywood.

* * * * *